United States Patent [19]

Valkeakari et al.

[11] Patent Number: 5,777,398
[45] Date of Patent: Jul. 7, 1998

[54] INTERNAL BACKUP POWER DEVICE FOR A COMPUTER

[75] Inventors: Jyrki Valkeakari, Helsinki; Seppo Suoranta, Lapinkyla, both of Finland

[73] Assignee: Compower Oy, Vantaa, Finland

[21] Appl. No.: 647,895

[22] PCT Filed: Dec. 8, 1994

[86] PCT No.: PCT/FI94/00555

§ 371 Date: Jun. 5, 1996

§ 102(e) Date: Jun. 5, 1996

[87] PCT Pub. No.: WO95/17777

PCT Pub. Date: Jun. 29, 1995

[30] Foreign Application Priority Data

Dec. 15, 1993 [FI] Finland ............................ 935628

[51] Int. Cl.⁶ .................................................. H02J 9/00
[52] U.S. Cl. .................... 307/66; 307/64; 307/150; 361/727; 364/492; 364/948.5; 360/97.01; 360/99.05; 346/137; 369/75.1
[58] Field of Search ................................ 307/66, 64, 80, 307/150; 301/727; 320/2; 364/492, 273–273.5, 948.4, 948.5; 360/97.01, 98.01, 99.05; 346/137; 369/75.1

[56] References Cited

U.S. PATENT DOCUMENTS

| 4,002,892 | 1/1977 | Zielinski | 307/150 |
|---|---|---|---|
| 4,422,163 | 12/1983 | Oldenkamp | 365/229 |
| 4,675,538 | 6/1987 | Epstein | 307/64 |
| 4,885,521 | 12/1989 | Crampton | 307/66 |
| 5,144,586 | 9/1992 | Faraci | 365/226 |
| 5,384,792 | 1/1995 | Hirachi | 307/66 |
| 5,612,854 | 3/1997 | Wiscombe et al. | 361/727 |

FOREIGN PATENT DOCUMENTS

| 52521/93 | 4/1994 | Australia. |
|---|---|---|
| 0594 972 A2 | 5/1994 | European Pat. Off. . |
| 2 262 170 | 5/1993 | United Kingdom. |

OTHER PUBLICATIONS

AccuCard (tm), Emerson UPS, Emerson Electric Company.
The Total Lan Plan (tm), Emerson Electric UK Ltd.
Patent Abstracts of Japan, vol. 16, No. 337, P–1390, abstracts of JP,A, 4–102112 (Hitachi Ltd), 3 Apr. 1992.

*Primary Examiner*—William M. Shoop, Jr.
*Assistant Examiner*—Albert W. Paladini
*Attorney, Agent, or Firm*—Nikaido, Marmelstein, Murray & Oram LLP

[57] ABSTRACT

A back-up power device for a microcomputer which can supply back-up power to a microcomputer in the event of a power failure. The power device is installed in a standard disc or hard disc drive slot of the computer. Switches and alarm lights of the power device are visible and accessible to the user without opening the case of the computer. The power device outputs a signal related to its operating status to the computer. The power device also measures the output voltage from the power source of the computer to compensate the voltage drop in the cables between the power device and the computer's power supply, and can be programmed to restart the computer after a power break if required.

10 Claims, 1 Drawing Sheet

5,777,398

INTERNAL BACKUP POWER DEVICE FOR A COMPUTER

BACKGROUND OF THE INVENTION

The invention concerns a device which will supply backup power to a microcomputer in the event of a power failure. This device can be firmly installed in an industrial-standard microcomputer in a space normally reserved for an industrial-standard disc or hard disc drive.

Backup power devices, or UPS (uninterruptible power supply) devices, are needed to ensure the faultless operation of a computer's electrical-components etc in the event of a temporary power failure. In the main, these backup power devices are separate, independent devices by which alternating current from the power mains is fed to the device to be protected, e.g. to the computer, when there is a power break. When the normal electricity supply is cut off, the backup power device feeds alternating current to the device to be protected, generally utilizing energy stored in batteries.

In addition to these traditional backup power devices, there are other, commercially-available, backup power devices, which are suitable for an industrial-standard microcomputer and are installed inside the computer. These internal backup power devices have some advantages over external backup power devices. External backup power devices first have to convert the few volts of direct current from the battery into perhaps 230 volts of alternating current which, in turn, is reconverted at the computer's power source into a few volts of direct current. However, an internal backup power device feeds direct current straight to the microcomputer's power supply channel when the computer's own power source is not working due to a power cut. As an internal backup power device does not need to handle dangerous voltage from the mains, it does not require such thorough protection. Therefore, it can be made more simply and economically than an external backup power device.

An internal backup power device can be built in close connection with the computer's power source. This requires that the computer's power source be changed, however, if the backup power property is added to the computer later, as is usually the case. A more practical way is to design the backup power device as a separate part which can be easily installed in the computer later.

The internal back-up power devices which are designed for computers made according to commercial industrial standards, and which are not built in close connection with the power source, are installed in the computer's expansion slots. This practice leads to certain problems, however. In order to supply enough electricity for even a few minutes, the batteries on the backup power device cards must be quite large. Therefore, these internal backup power devices take up at least one, and often two expansion slots. In large computer cases, there are usually sufficient expansion slots, but in small and low cases there are so few expansion slots that it is not usually possible to reserve two slots for the backup power device, or at least it considerably restricts the usage of the computer.

Another drawback of using expansion cards for the backup power device is that the batteries on the cards are both large and heavy. The means of attaching the expansion cards inside the computer has not been designed for such a large mass, and therefore there is a great danger that the backup power device or its attachment points in the computer will not be able to withstand the forces to which they are subjected during transportation.

SUMMARY OF THE INVENTION

A backup power device designed in accordance with the invention makes decisive progress in solving these problems. The invention is characterized by the features presented in the attached claims.

Industrial-standard computers almost always have extra, unused space for a disc or hard disc drive. A backup power device can be installed firmly in this space by using the attachments meant for the disc or hard disc drive. When thus installed, the internal backup power device does not restrict the amount of equipment which can be used. As the space reserved for the disc drive extends to the front panel of the computer, it is possible to install alarm lights on the front panel to inform the computer user of the functioning of the backup power device. This is much more difficult if the backup power device is installed in the expansion slots.

The invention is described more exactly in the following, with examples and with reference to the attached drawings in which

DESCRIPTION OF THE PREFERRED EMBODIMENTS

Figure 1:
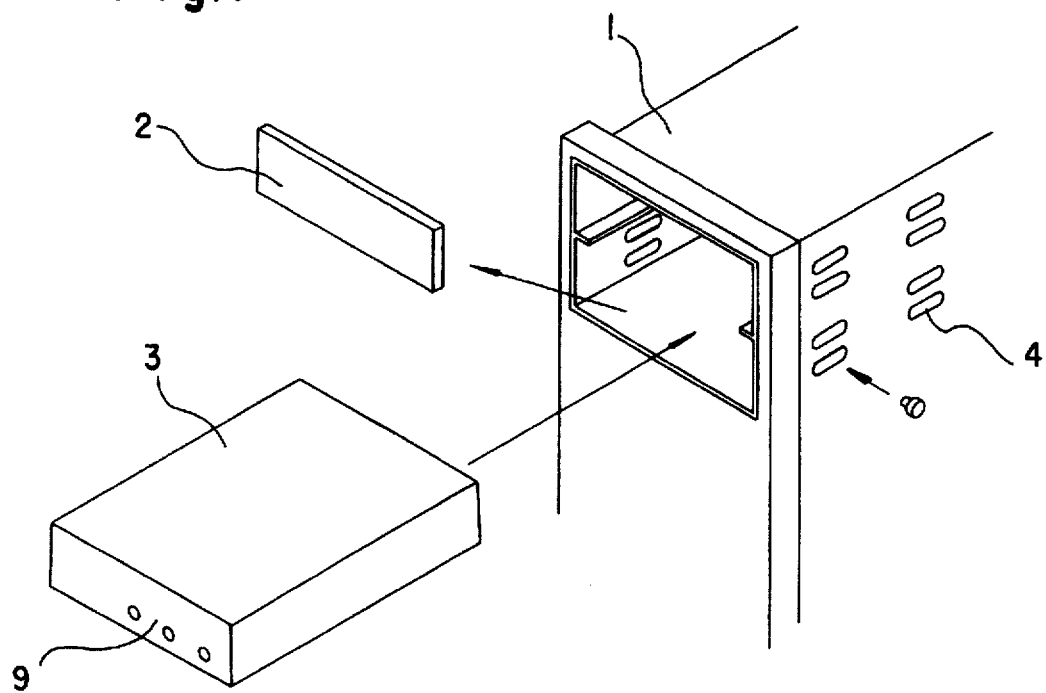
FIG. 1 shows a certain method of installing a backup power device according to the invention.
Figure 2:
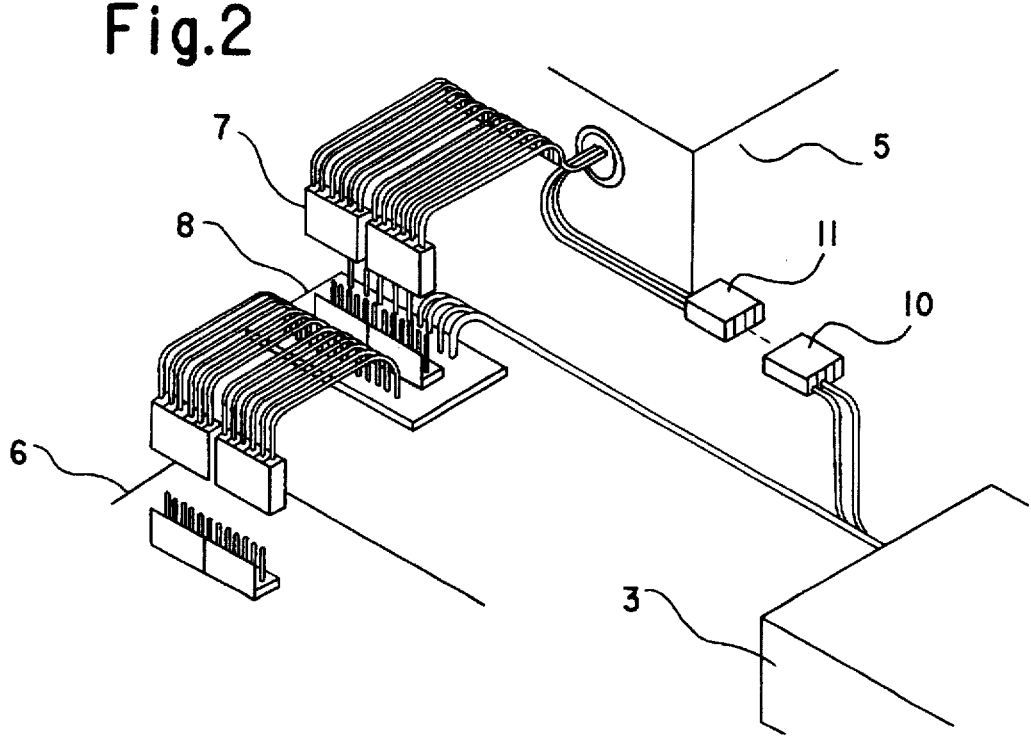
FIG. 2 shows the electrical connection of the backup power device to the computer.

The cover plate 2, covering the disc or hard disc drive space, is removed from the case of an industrial-standard microcomputer 1. A backup power device 3 is installed in the disc or hard disc drive space of the computer, and is attached by means of the attachments 4 designed for the disc or hard disc drive.

The backup power device 3 is connected to the power supply channel of the computer 1 by, for example, disconnecting the power supply lines 7 that normally link the power source 5 directly to the motherboard 6 of the computer, and reconnecting them to the branch circuit 8 coming from the backup power device 3. By this means, the power supply is connected to the motherboard 6 of the computer. Professionals in the field will be aware that the use of this kind of branch circuit is only one of the possible methods of connecting the backup power device to the microcomputer parallel to its own power source. The power supply can be routed completely via the backup power device, for example. The alarm lights and control switches 9 of the backup power device are visible to the user and are outside the computer.

In order to compensate for voltage losses in the supply lines, the output voltage to be used by the backup power device is measured at the current feeding point and is regulated on the basis of the measurements. This method of measuring voltage is well-known to professionals in this field. The backup power device 3 measures the voltage directly from the computer's power source 5. For this purpose a voltage measurement coupler 10 is used to connect the backup power device to an unused power supply connector 11 designed for use with a disc or hard disc drive. Thus the backup power device 3 takes its measurements from the same point as the computer's own power source 5, which ensures the coordination of the backup power device 3 and the computer's power source 5 in the best possible way.

A backup power device according to the invention transmits signals concerning its operating status to the computer in a suitable way so that the computer can read them. One commonly used way is to connect the signals to the computer's serial port. Through these signals the backup power device can give warning of a power break, whereupon a certain computer program can halt the functioning of the computer in a controlled way, before the battery of the backup power device empties.

If a power break comes to an end before the battery of the backup power device is empty, the computer learns of it from these signals and can start up the system again. As restarting does not succeed in all situations on all computer operating systems, e.g. on many UNIX systems, the computer must be restarted either by switching off the power supply or by otherwise setting the motherboard in its starting position. When the computer's power supply comes through an external backup power device, the device can switch off the computer's power supply for a moment and then restart the computer. An internal backup power device cannot do this, but it can restart the computer by being connected to signals reserved in the computer for this purpose. In an industrial-standard microcomputer, these signals are the Power Good signal, which is carried in the same group of lines as the power supply lines, and the Reset signal which is often connected to a reset switch in the front panel of the computer.

We claim:

1. A back-up power device for installation inside an industrial-standard microcomputer which supplies electricity to the microcomputer upon occurrence of a normal external power failure, wherein the device is sized to fit in a standard disc or hard disc drive slot of the microcomputer, the device comprising:

an energy store separate from a power source of said microcomputer; and fastening means for fastening the device in a standard disc or hard disc drive slot of said microcomputer.

2. A back-up power device as recited in claim 1, the device further comprising:

at least one control switch; and at least one alarm light, wherein said at least one control switch and said at least one alarm light are visible and available to a user of said microcomputer without opening a case of said microcomputer.

3. A back-up power device as recited in claim 1, wherein a signal representing an operating status of said device is provided to said microcomputer.

4. A back-up power device as recited in claim 1, wherein said back-up power device measures an output voltage from the power source of said microcomputer.

5. A back-up power device as recited in claim 4, wherein said output voltage is regulated on the basis of said measurement.

6. A back-up power device as recited in claim 1, wherein said back-up power device is programmed to restart said microcomputer after the occurrence of a power break to said microcomputer.

7. A back-up power device for installation inside an industrial-standard microcomputer which supplies electricity to the microcomputer upon occurrence of a normal external power failure, wherein the device is sized to fit in a standard disc or hard disc drive slot of the mircrocomputer, the device comprising:

an energy store separate from a power source of the microcomputer, the energy store providing power to the microcomputer upon occurrence of a power failure;

fastening means for fastening the device in a standard disc or hard disc drive slot of the microcomputer;

at least one control switch for controlling an operation of the device; and at least one alarm light for indicating an alarm condition of the device, wherein said at least one control switch and said at least one alarm light are visible and available to a user of said microcomputer without opening a case of said microcomputer.

8. A back-up power device as recited in claim 3, the device further comprising:

means for providing a signal from the device, representing an operating status of the device, to said microcomputer.

9. A back-up power device as recited in claim 3, the device further comprising:

measuring means for measuring an output voltage from the power source of said microcomputer; and regulating means coupled to said measuring means, for regulating the output voltage on the basis of said measurement.

10. A back-up power device as recited in claim 3, the device further comprising:

restarting means for restarting the microcomputer after an occurrence of a power break to the microcomputer.

* * * * *